Sept. 27, 1927.

A. R. TEARE

HEATING AND VENTILATING APPARATUS

Original Filed Jan. 27, 1926

Re. 16,751

Inventor

Albert R. Teare

By Bates Macklin Gobrick & Teare

Attorneys

Reissued Sept. 27, 1927. Re. 16,751

UNITED STATES PATENT OFFICE.

ALBERT R. TEARE, OF LAKEWOOD, OHIO, ASSIGNOR TO JAMES C. MILES, OF CLEVELAND, OHIO.

HEATING AND VENTILATING APPARATUS.

Original No. 1,607,372, dated November 16, 1926, Serial No. 84,081, filed January 27, 1926. Application for reissue filed August 6, 1927. Serial No. 211,240.

This invention relates to heating and ventilating apparatus and is especially concerned with a fan and damper unit which may be employed in connection with the operation of a hot air heating system.

One of the objects of the present invention is to provide a fan and damper unit which is disposed adjacent the inlet to a hot air heating furnace and which is so designed that the damper is positively actuated whenever the fan is either set in motion or stopped. To this end I employ an electrically operated fan with a mechanical connection between the switch and the damper so as to shut the damper when the fan is started and to open the damper when the fan is stopped. In this way, the inlet passageway is sufficiently opened to permit the normal operation of the system on the gravity basis. Moreover, whenever the fan is set in operation, the damper is positively closed so that all of the air entering the system, must flow only through the fan opening.

Figure 1:
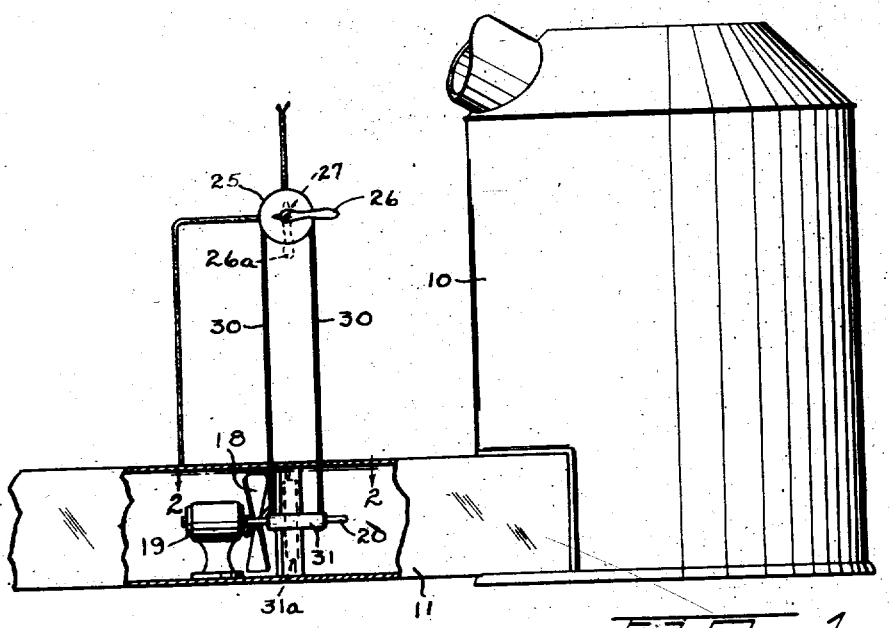
Figure 2:
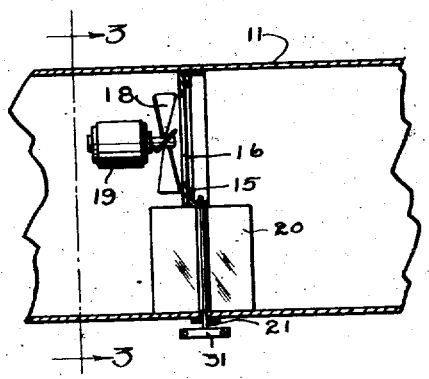
Figure 3:
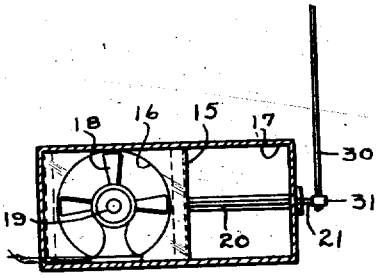
Figure 4:
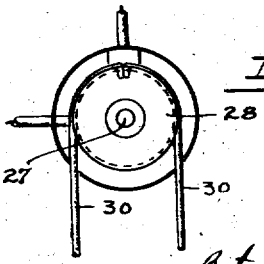
Figure 5:
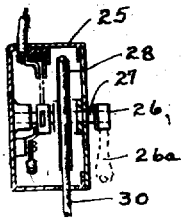

The preferred means for carrying out my invention is illustrated in the accompanying drawings wherein Fig. 1 is a side elevation of a hot air heating furnace having my invention associated therewith; Fig. 2 is a section taken on a plane indicated by the line 2—2 in Fig. 1; while Fig. 3 is a section taken on a plane indicated by the line 3—3 in Fig. 2; Figs. 4 and 5 are sections showing details of construction of the control mechanism.

I have illustrated my invention in connection with a hot air furnace indicated at 10 which has an inlet passageway adjacent the bottom thereof. This passageway is shown in the nature of a conduit which is rectangular in cross-section. Disposed across the inlet passageway I have shown a frame 15 which has a fan opening 16 and a damper opening 17 arranged side by side. A fan 18 with an actuating motor 19 is shown adjacent the fan opening, while a damper 20 which is pivotally mounted at 21 is shown adjacent the damper opening.

The circuit to the motor is controlled by a switch which is mounted within a switch box 25. Any suitable knife switch may be sufficient for this purpose, but the construction illustrated embodies an operating arm 26 which is disposed outside the box and is mounted upon a pivot 27. Within the box 25, I have shown a sheave 28 which is also mounted upon the shaft 27 and is operatively connected as by cords or chains 30 to an arm 31 which is mounted on the shaft 21 outside the conduit 11. In this way the damper may be swung from open to closed position whenever the arm 26 is moved to open the circuit to the motor 19. In Fig. 1, the damper is shown in open position in full lines, while the closed position is indicated by broken lines $31^a$. A corresponding position of the actuating arms is indicated at $26^a$.

An advantage of an apparatus embodying my invention is that the control box may be placed in a room above the furnace room and that the operator is assured of a positive closing of the damper whenever the fan is started. Moreover my invention may be readily installed in existing furnaces without necessitating changes in the construction thereof.

I claim:

1. In combination, a heating chamber of a hot air furnace having an air inlet, a fan and damper disposed across the inlet, an electric motor for actuating the fan, a switch for controlling the operation of said motor, and a mechanical connection between the switch and damper, whereby the damper is opened when the switch is opened and is closed when the switch is closed.

2. In combination with the heating chamber of a hot air furnace having an air inlet passageway, a fan and a damper associated with the frame, an electric motor for operating the fan and a switch for controlling the circuit to said motor, there being a positive mechanical connection between the switch and damper, whereby operation of the switch effects operation of the damper.

3. In combination with the heating chamber of a hot air furnace having an inlet passageway, of a frame disposed across the passageway and having a fan opening and a damper opening, a damper pivotally mounted across the damper opening, a fan disposed adjacent the fan opening, an electric motor associated with the fan, a switch in circuit with said motor, operating means for said switch and a mechanical connection between said means and said damper whereby the damper is actuated whenever the switch actuated.

4. In combination with the heating chamber of a hot air furnace having an inlet passageway, of a furnace having an inlet passageway, of a frame disposed across the passageway and having a fan opening and a damper opening, an electrically operated motor having a fan associated therewith and disposed adjacent the fan opening, a pivotally mounted damper disposed adjacent the damper opening, an electric switch in circuit with said motor, said switch being mounted upon a pivot, a sheave also mounted on said pivot and means connecting the sheave with said damper whereby operation of the sheave effects operation of the damper, said sheave being actuated whenever the switch is actuated so as to close the damper whenever the fan is set in operation, and to open the damper whenever the fan is stopped.

In testimony whereof, I hereunto affix my signature.

ALBERT R. TEARE.